United States Patent
Harada et al.

(10) Patent No.: US 11,111,346 B2
(45) Date of Patent: Sep. 7, 2021

(54) METAL-COATED NON-SPHERICAL RESIN PARTICLES AND METHOD FOR PRODUCING SAME, ALIGNED FILM OF METAL-COATED NON-SPHERICAL RESIN PARTICLES AND METHOD FOR PRODUCING SAME, PARTICLES, AND METHOD FOR PRODUCING PARTICLE-ALIGNED FILM

(71) Applicant: SEKISUI KASEI CO., LTD., Osaka (JP)

(72) Inventors: Ryosuke Harada, Shiga (JP); Eiji Tokunaga, Tokyo (JP); Sou Aizawa, Tokyo (JP); Keisuke Seto, Tokyo (JP)

(73) Assignee: SEKISUI KASEI CO., LTD., Osaka (JP)

( * ) Notice: Subject to any disclaimer, the term of this patent is extended or adjusted under 35 U.S.C. 154(b) by 288 days.

(21) Appl. No.: 16/088,925

(22) PCT Filed: Mar. 31, 2017

(86) PCT No.: PCT/JP2017/013851
§ 371 (c)(1),
(2) Date: Sep. 27, 2018

(87) PCT Pub. No.: WO2017/171087
PCT Pub. Date: Oct. 5, 2017

(65) Prior Publication Data
US 2020/0325283 A1    Oct. 15, 2020

(30) Foreign Application Priority Data

Mar. 31, 2016  (JP) .............................. JP2016-071706

(51) Int. Cl.
*C08J 5/18* (2006.01)
*C08J 7/04* (2020.01)
*C08J 7/044* (2020.01)
*C08J 3/11* (2006.01)
*C08J 3/12* (2006.01)

(52) U.S. Cl.
CPC . *C08J 7/04* (2013.01); *C08J 3/11* (2013.01); *C08J 3/128* (2013.01); *C08J 5/18* (2013.01); *C08J 7/044* (2020.01); *C08J 2333/12* (2013.01); *C08J 2333/14* (2013.01); *C08J 2367/00* (2013.01)

(58) Field of Classification Search
CPC ..... C08J 3/128; C08J 7/044; C08J 3/11; C08J 7/04; C08J 5/18; C23C 18/42; C23C 18/20; C23C 18/285; C23C 18/1641; C23C 18/2073; C23C 18/1651; H01B 5/14; G01N 21/41
USPC ......................... 523/204; 428/403
See application file for complete search history.

(56) References Cited

U.S. PATENT DOCUMENTS

| | | | |
|---|---|---|---|
| 8,568,750 B2 | 10/2013 | Harada | |
| 9,187,632 B2* | 11/2015 | Harada | ..................... C08F 2/22 |
| 9,401,497 B2 | 7/2016 | Fukuura | |
| 2009/0035578 A1* | 2/2009 | Watanabe | ............ G02B 5/0242 428/402 |
| 2009/0297773 A1* | 12/2009 | Wang | ................... G02B 5/0226 428/147 |
| 2011/0287076 A1 | 11/2011 | Harada | |
| 2014/0086862 A1 | 3/2014 | Nakamura et al. | |
| 2014/0194565 A1 | 7/2014 | Harada | |
| 2015/0243931 A1 | 8/2015 | Fukuura | |
| 2017/0326073 A1 | 11/2017 | Murakami | |
| 2017/0358384 A1 | 12/2017 | Kageyama et al. | |

FOREIGN PATENT DOCUMENTS

| | | |
|---|---|---|
| CN | 104620393 | 5/2015 |
| CN | 105396149 | 3/2016 |
| JP | 2003-181275 | 7/2003 |
| JP | 2005-36265 | 2/2005 |
| JP | 2006-306998 | 11/2006 |
| JP | 2013-231641 | 11/2013 |
| JP | 2015-10143 | 1/2015 |
| JP | 2016-130354 | 7/2016 |
| WO | 2010/113812 | 10/2010 |
| WO | 2012/132533 | 10/2012 |
| WO | 2013/027849 | 2/2013 |
| WO | 2016/084849 | 6/2016 |

OTHER PUBLICATIONS

Machine Translation of JP 2015-10143 (Year: 2015).*
Partial Supplementary European Search Report dated Nov. 27, 2019 in corresponding European Application No. 17775618.6.
Hu et al., "Fabrication, properties and applications of Janus particles", Chem. Soc. Rev., 2012, vol. 41, pp. 4356-4378.
Perro et al., "Design and synthesis of Janus micro- and nanoparticles", Journal of Materials Chemistry, 2005, vol. 15, pp. 3745-3760.
Yang et al., "Microfluidic synthesis of multifunctional Janus particles for biomedical applications", Lab on a Chip, 2012, vol. 12, pp. 2097-2102.
International Search Report dated Jun. 20, 2017 in International (PCT) Application No. PCT/JP2017/013851.

(Continued)

*Primary Examiner* — Hannah J Pak (74) *Attorney, Agent, or Firm* — Wenderoth, Lind & Ponack, L.L.P.

(57) ABSTRACT

The present invention provides non-spherical metal-coated irregularly-shaped resin particles that can improve characteristics, such as light diffusion characteristics and reflection characteristics, when used for optical applications, compared with spherical metal-coated resin particles. Specifically, the present invention provides metal-coated irregularly-shaped resin particles in which part of the surface of irregularly-shaped resin particles is coated with metal.

19 Claims, 3 Drawing Sheets

(56) References Cited

OTHER PUBLICATIONS

Iwashita et al., "Creation of novel colloidal mesostructures with a non-thermal fluctuation", Scientific Research Fund-Subsidized Project (Academic Research Foundation Subsidy) Research Result Report, Apr. 26, 2013, with English translation.
Communication pursuant to Article 94(3) EPC dated Feb. 1, 2021, in corresponding European Patent Application No. 17775618.6.

* cited by examiner

METAL-COATED NON-SPHERICAL RESIN PARTICLES AND METHOD FOR PRODUCING SAME, ALIGNED FILM OF METAL-COATED NON-SPHERICAL RESIN PARTICLES AND METHOD FOR PRODUCING SAME, PARTICLES, AND METHOD FOR PRODUCING PARTICLE-ALIGNED FILM

TECHNICAL FIELD

The present invention relates to metal-coated non-spherical resin particles and a method for producing the same, an aligned film of metal-coated non-spherical resin particles and a method for producing the same, a particle group, and a method for producing a particle-aligned film. The present invention also relates to a dispersion, a resin composition, and an external preparation, each of which comprises metal-coated non-spherical resin particles.

BACKGROUND ART

Metal/non-metal Janus particles in which spherical particles are partially coated with metal have attracted attention because of their movement, which is different from that of conventionally known isotropic particles; and have been studied in various ways.

For example, PTL 1 discloses metal/non-metal Janus particles in which a metal layer, such as gold, silver, platinum, aluminum, or copper, is partially formed in a hat shape on spherical fine particles.

Further, NPL 1 discloses metal/non-metal Janus particles having a hemispherical surface that is metal-coated by forming a monolayer of spherical silica particles on a glass substrate, and vapor-depositing metal (mainly gold) thereon.

CITATION LIST

Patent Literature

PTL 1: JP2013-231641A

Non-Patent Literature

NPL 1: Science Research Grant-Subsidized Project, Research Result Report, "Creation of novel colloidal mesostructures with a non-thermal fluctuation"

SUMMARY OF INVENTION

Technical Problem

However, the metal/non-metal Janus particles disclosed in PTL 1 and NPL 1 are both spherical particles. Non-spherical metal/non-metal Janus particles have been heretofore unreported.

Moreover, it is difficult to control non-spherical particles having a shape different from a spherical shape (non-spherical particles), and it is difficult to produce metal/non-metal Janus particles in which part of the surface of the non-spherical particles is coated with metal.

Accordingly, an object of the present invention is to provide metal-coated non-spherical resin particles in which part of the surface of non-spherical resin particles is coated with metal, and a simple method for producing the same. Another object of the present invention is to provide an aligned film of metal-coated non-spherical resin particles and a method for producing the same, a particle group, and a simple method for producing a particle-aligned film.

Solution to Problem

The present inventors conducted extensive research in order to achieve the above objects, and consequently found that metal-coated non-spherical resin particles in which part of the surface of non-spherical resin particles was coated with metal was obtained by emulsifying a mixture of the non-spherical resin particles and a specific organic solvent in water to obtain an emulsion, then evaporating the organic solvent to form an aligned film of the non-spherical resin particles, coating part of the particle-aligned film with metal, and then extracting the non-spherical resin particles from the aligned film. The present invention has been completed upon further research based on this finding.

Specifically, the present invention includes inventions described in the following items.

Item 1. Metal-coated non-spherical resin particles, in which part of the surface of non-spherical resin particles is coated with metal.

Item 2. The metal-coated non-spherical resin particles according to Item 1, wherein the resin particles have an aspect ratio of 1.2 or more.

Item 3. The metal-coated non-spherical resin particles according to Item 1, wherein the non-spherical resin particles have a circular outer shape when viewed from a direction in which a project area is the largest, and the non-spherical resin particles have a non-circular outer shape when viewed from a direction in which a project area is the smallest.

Item 4. The metal-coated non-spherical resin particles according to Item 1, wherein the resin particles have (1) multiple flat portions, (2) a flat portion and a curved portion, or (3) a curved portion.

Item 5. The metal-coated non-spherical resin particles according to Item 1, wherein the resin particles have a surface coated with metal and a surface that is not coated with metal.

Item 6. The metal-coated non-spherical resin particles according to Item 1, wherein the non-spherical resin particles have a hemispherical shape with a hemispherical portion and a flat portion.

Item 7. The metal-coated non-spherical resin particles according to Item 6, wherein at least part of the surface of the hemispherical portion is coated with metal.

Item 8. The metal-coated non-spherical resin particles according to Item 6, wherein at least part of the surface of the flat portion is coated with metal.

Item 9. The metal-coated non-spherical resin particles according to Item 1, wherein the non-spherical resin particles have a biconvex lens shape with a curved portion, or a flat shape.

Item 10. The metal-coated non-spherical resin particles according to Item 9, wherein only one side convex lens portion of the biconvex lens shape is coated, or only one side portion of the flat shape is coated.

Item 11. The metal-coated non-spherical resin particles according to Item 1, which have phototaxis.

Item 12. An aligned film in which the metal-coated non-spherical resin particles according to Item 1 are regularly aligned on a plane.

Item 13. A particle group of the metal-coated non-spherical resin particles according to Item 1, wherein the coefficient of variation of the number average particle diameter is 30% or less.

Item 14. A particle group of the metal-coated non-spherical resin particles according to Item 1, wherein the particle group has an average aspect ratio of 1.2 or more.

Item 15. A particle group of the metal-coated non-spherical resin particles according to Item 1, wherein the coefficient of variation of the aspect ratio is 30% or less.

Item 16. A method for producing a particle-aligned film, the method comprising:

preparing a mixture of non-spherical resin particles and an organic solvent that is able to disperse the non-spherical resin particles, has a lower specific gravity than water, and is immiscible with water;

emulsifying the mixture in water to obtain an emulsion; and allowing the emulsion to stand to evaporate the organic solvent, and forming a particle-aligned film of the non-spherical resin particles at a gas-liquid interface.

Item 17. The method for producing a particle-aligned film according to Item 16, wherein the non-spherical resin particles have a hemispherical shape with a hemispherical portion and a flat portion.

Item 18. A method for producing an aligned film of metal-coated non-spherical resin particles, the method comprising:

extracting a particle-aligned film obtained by the production method according to Item 16 or 17, and coating part of the particle-aligned film with metal.

Item 19. A method for producing metal-coated non-spherical resin particles, the method comprising extracting metal-coated non-spherical resin particles from an aligned film of metal-coated non-spherical resin particles obtained by the production method according to Item 18.

Item 20. A dispersion comprising the metal-coated non-spherical resin particles according to Item 1.

Item 21. The dispersion according to Item 20, which has electrical conductivity.

Item 22. A resin composition comprising the metal-coated non-spherical resin particles according to Item 1.

Item 23. An external preparation comprising the metal-coated non-spherical resin particles according to Item 1.

Advantageous Effects of Invention

The present invention can provide non-spherical metal-coated non-spherical resin particles that can improve characteristics, such as light diffusion characteristics and reflection characteristics, when used for optical applications, compared with spherical metal-coated resin particles.

DESCRIPTION OF EMBODIMENTS

Preferred embodiments of the present invention are described in detail below.

The present invention includes metal-coated non-spherical resin particles and a method for producing the same, an aligned film of metal-coated non-spherical resin particles and a method for producing the same, a particle group, and a method for producing a particle-aligned film.

In the present invention, metal-coated non-spherical resin particles can be simply produced in such a manner that an aligned film of non-spherical resin particles is produced by a production method described later, after which an aligned film of metal-coated non-spherical resin particles is produced; and subsequently the metal-coated non-spherical resin particles are extracted from the metal-coated non-spherical resin particle-aligned film.

In the following, the method for producing a particle-aligned film (an aligned film of non-spherical resin particles) and the method for producing an aligned film of metal-coated non-spherical resin particles are first described. After that, the metal-coated non-spherical resin particles are described.

1. Method for Producing Particle-Aligned Film

The method for producing a particle-aligned film of the present invention comprises:

(1) step 1 of preparing a mixture of non-spherical resin particles and an organic solvent that is able to disperse the non-spherical resin particles, has a lower specific gravity than water, and is immiscible with water;

(2) step 2 of emulsifying the mixture in water to obtain an emulsion; and (3) step 3 of allowing the emulsion to stand to evaporate the organic solvent, and forming a particle-aligned film of the non-spherical resin particles at a gas-liquid interface.

Each step is explained below.

Step 1

Step 1 is to prepare a mixture of non-spherical resin particles and an organic solvent that is able to disperse the non-spherical resin particles, has a lower specific gravity than water, and is immiscible with water.

Non-spherical Resin Particles

The non-spherical resin particles preferably have a circular outer shape when viewed from a direction in which the project area is the largest, and have a non-circular outer shape when viewed from a direction in which the project area is the smallest.

The shape of the above non-spherical resin particles is explained with reference to FIGS. 1(a) to (e).

Figure 1:
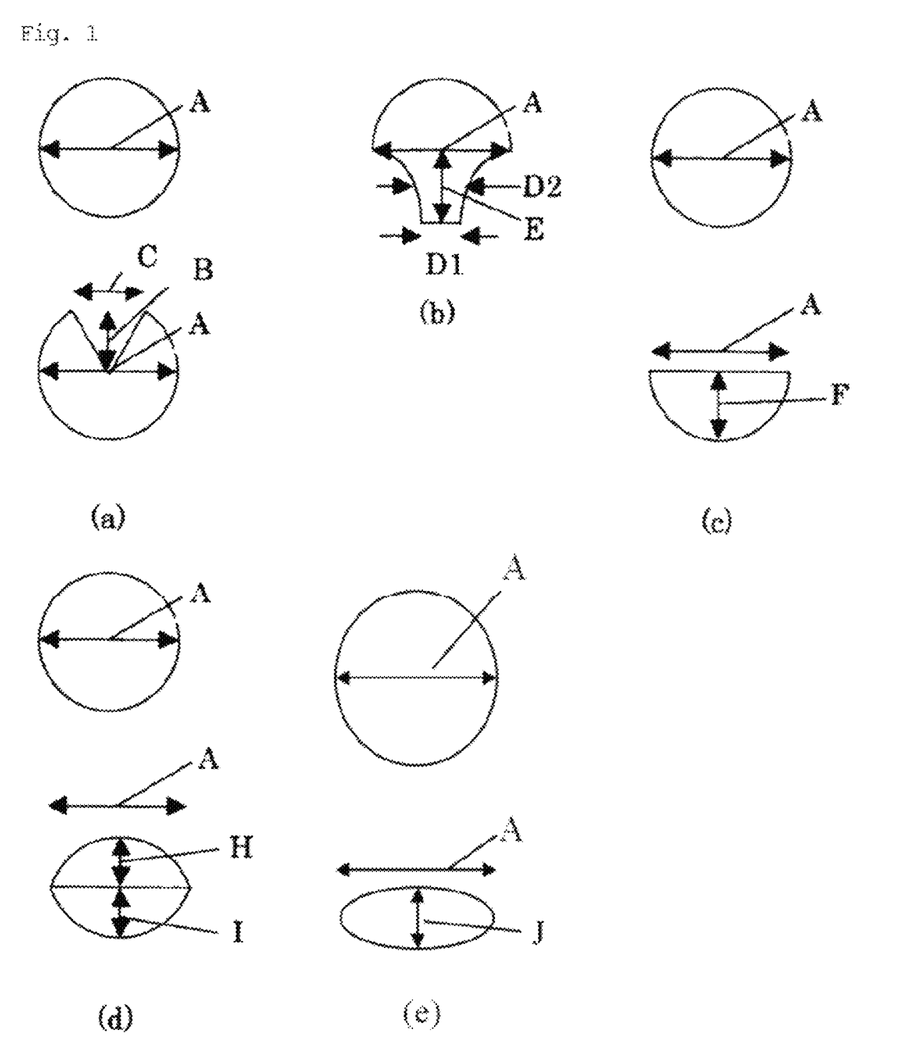
FIGS. 1(a) to (e) show schematic explanatory views of non-spherical resin particles.

FIG. 1(a) shows projection views of an non-spherical resin particle having a U-shaped cross-section. The upper figure shows a case where the project area is the largest, and the lower figure shows a case where the project area is the smallest. The outer shape of the particle in the figure with the largest project area is circular. Moreover, the outer shape of the particle in the figure with the smallest project area has a recess corresponding to the projection view of a notched portion, and a fan shape. The recess has a depth B that is 0.1 to 0.9 times larger than the particle diameter A of the non-spherical resin particle, and an opening width C that is 0.1 to 0.95 times larger than the particle diameter A of the non-spherical resin particle.

FIG. 1(b) shows a view in which the project area of a mushroom-like non-spherical resin particle is the smallest. In this figure, the non-spherical resin particle comprises an umbrella portion and a shank. The width D1 of the bottom of the shank is 0.1 to 0.8 times larger than the particle diameter A of the non-spherical resin particle, the width D2 of an intermediate portion of the shank is 0.2 to 0.9 times larger than the particle diameter A of the non-spherical resin particle, and the height E in the axial length direction is 0.2 to 1.5 times larger than the particle diameter A of the non-spherical resin particle.

FIG. 1(c) shows projection views of a semispherical non-spherical resin particle. The upper figure shows a case where the project area is the largest, and the lower figure shows a case where the project area is the smallest. In the figure with the smallest project area, the height F of the non-spherical resin particle is 0.2 to 0.8 times larger than the particle diameter A of the non-spherical resin particle.

FIG. 1(d) shows projection views of a Go-stone-like non-spherical resin particle. The upper figure shows a case where the project area is the largest, and the lower figure shows a case where the project area is the smallest. In the figure with the smallest project area, the heights H and I of the convex lens are 0.2 to 0.8 times larger than the particle diameter A of the non-spherical resin particle.

FIG. 1(e) shows projection views of a flat non-spherical resin particle. The upper figure shows a case where the project area is the largest, and the lower figure shows a case where the project area is the smallest. In the figure with the smallest project area, the height J of the flat particle is 0.2 to 0.8 times larger than the particle diameter A of the non-spherical resin particle.

In FIGS. 1(a) to (e), the particle diameter A can be set within a range of 0.5 to 30 μm. Further, the sphere-equivalent volume average particle diameter of the non-spherical resin particles can be set with a range of 0.5 to 30 μm. The non-spherical resin particles shown in FIGS. 1(a) to (e) can be obtained by a method for producing non-spherical resin particles, described later. FIGS. 1(a) to (e) show ideal shapes for explaining the shape of the non-spherical resin particles. The non-spherical resin particles actually used in the present invention include those with a slight bulge, and those having a dent.

The non-spherical resin particles have a non-spherical shape, and preferably have (1) multiple flat portions, (2) a flat portion and a curved portion, or (3) a curved portion.

Non-spherical resin particles having (1) multiple flat portions refer to, for example, particles having a triangular pyramid shape, a cubic shape, or a rectangular parallelepiped shape. The present specification also includes non-spherical resin particles consisting of multiple flat portions.

Non-spherical resin particles having (2) a flat portion and a curved portion refer to, for example, particles having a hemispherical shape, a disc shape, or a cylindrical shape. The present specification also includes non-spherical resin particles consisting of a flat portion and a curved portion.

Non-spherical resin particles having (3) a curved portion refer to, for example, particles having a Go-stone shape, a flat shape, an erythrocyte shape, a biconvex lens shape, or a concavo-convex lens shape. The present specification also includes non-spherical resin particles consisting of a curved portion.

According to the above structures (1) to (3), the shape of the non-spherical resin particles is highly irregular; thus, when used for optical applications, the metal-coated non-spherical resin particles of the present invention can further improve characteristics, such as light diffusion characteristics and reflection characteristic anisotropy, compared with spherical metal-coated resin particles.

The sphere-equivalent volume average particle diameter of the non-spherical resin particles is preferably 0.1 to 300 μm, more preferably 0.5 to 100 m, and particularly preferably 1 to 30 μm.

The aspect ratio of the non-spherical resin particles is preferably 1.2 or more, more preferably 1.2 to 5.0, and particularly preferably 1.4 to 3.5, in terms of the above light diffusion characteristics, reflection characteristic, etc.

In the present specification, the aspect ratio of the non-spherical resin particles means the ratio of the major axis of each non-spherical resin particle to the minor axis thereof (major axis of non-spherical resin particle/minor axis of non-spherical resin particle).

The method for producing non-spherical resin particles is not limited. For example, non-spherical resin particles can be preferably produced by allowing seed particles to absorb a polymerizable vinyl monomer in an aqueous emulsion, and polymerizing the absorbed polymerizable vinyl monomer.

This production method is described below as a representative example.

Raw Materials for Producing Non-Spherical Resin Particles, and Method for Producing Non-Spherical Resin Particles The raw materials for producing non-spherical resin particles, and the method for producing non-spherical resin particles are described below.

Seed Particles

The seed particles are preferably resin particles derived from a monomer containing a (meth)acrylic acid ester at least containing an alkyl group having 5 or less carbon atoms in its ester portion.

The monomer for forming resin particles preferably contains 50 wt. % or more of a (meth)acrylic acid ester containing an alkyl group having 3 or more and 5 or less carbon atoms in its ester portion.

Resin particles derived from such monomers are likely to become non-spherical (non-spherical) particles.

Examples of the alkyl group having 3 or more and 5 or less carbon atoms include linear alkyl groups, such as n-propyl, n-butyl, and n-pentyl; and branched alkyl groups, such as isopropyl, isobutyl, and t-butyl.

Examples of the (meth)acrylic acid ester include n-propyl (meth)acrylate, isopropyl (meth)acrylate, n-butyl (meth)acrylate, isobutyl (meth)acrylate, t-butyl (meth)acrylate, and like monomers. These monomers may be used singly or in combination of two or more.

Among these, resin particles using a (meth)acrylic acid ester having a branched alkyl group (e.g., isopropyl, isobutyl, or t-butyl) are preferable because they are likely to become non-spherical (non-spherical) resin particles.

The weight average molecular weight of the seed particles measured by GPC (gel permeation chromatography) is 150,000 to 1 million, and preferably 200,000 to 800,000, in terms of producing non-spherical resin particles.

The size and shape of the seed particles are not particularly limited. Spherical particles having a particle size of 0.1 to 5 m are generally used as the seed particles. The particle diameter of the seed particles can be measured by a laser diffraction particle size analyzer.

Method for Producing Seed Particles

The method for producing seed particles is not particularly limited. Known methods, such as emulsion polymerization, soap-free emulsion polymerization, seed polymerization, and suspension polymerization, can be used. Preferable production methods are emulsion polymerization, soap-free emulsion polymerization, and seed polymerization, in consideration of the particle diameter evenness of seed particles and the simplicity of the production method.

Polymerization may be performed in the presence of a molecular weight regulator. Usable examples of molecular weight regulators include α-methylstyrene dimer; mercaptans, such as n-octyl mercaptan and t-dodecyl mercaptan; terpenes, such as t-terpinene and dipentene; halogenated hydrocarbons (e.g., chloroform and carbon tetrachloride); and like chain transfer agents. The molecular weight regulator is preferably used in an amount of 0.1 to 10 parts by weight based on 100 parts by weight of the monomer for producing seed particles.

Polymerizable Vinyl Monomer

The polymerizable vinyl monomer is not particularly limited, as long as it is a monomer containing 5 to 50 wt % of crosslinkable monomer. Usable examples of crosslinkable monomers include polyfunctional monomers having two or more polymerizable vinyl groups per molecule, such as ethylene glycol dimethacrylate, trimethylolpropane trimethacrylate, and divinylbenzene. In terms of producing non-spherical resin particles, the amount of crosslinkable monomer used is preferably 5 to 50 wt. %, and more preferably 10 to 40 wt. %, based on the total amount of the polymerizable vinyl monomer.

The polymerizable vinyl monomer may contain other monomers, if necessary. Examples of other monomers include (meth)acrylic acids; (meth)acrylic acid alkyl esters, such as methyl (meth)acrylate, ethyl (meth)acrylate, n-butyl (meth)acrylate, isobutyl (meth)acrylate, and t-butyl (meth)acrylate; (meth)acrylic acid derivatives, such as (meth)acrylamide, 2-hydroxylethyl (meth)acrylate, and glycidyl (meth)acrylate; vinyl acetate; acrylonitrile; aromatic vinyl monomers, such as styrene, vinyl toluene, and t-butyl styrene; and the like.

Among these, (meth)acrylic acid alkyl esters are preferable, and (meth)acrylic acid esters having an alkylene oxide group are more preferable, because non-spherical (non-spherical) particles can be easily obtained.

An example of such (meth)acrylic acid esters is a compound of the following formula (1):

wherein $R_1$ is H or $CH_3$; $R_2$ and $R_3$ are different and are each an alkylene group selected from $C_2H_4$, $C_3H_6$, $C_4H_8$, and $C_5H_{10}$; m is an integer of 0 to 50 and n is an integer of 0 to 50, provided that m and n are not 0 at the same time; and $R_4$ is H or $CH_3$.

In the monomer of the formula (1), m and n are preferably 0 to 30, and more preferably 0 to 15, in terms of polymerization stability.

A commercial product can be used as the (meth)acrylic acid ester having an alkylene oxide group. Examples of such commercial products include the Blemmer series, produced by NOF Corporation. More preferable among the Blemmer series are Blemmer 50PEP-300 (a mixture wherein $R_1$ is $CH_3$, $R_2$ is $C_2H_5$, $R_3$ is $C_3H_6$, m is 3.5 on average, and n is 2.5 on average; and $R_4$ is H), Blemmer 70PEP-350B (a mixture of the above formula (1) wherein $R_1$ is $CH_3$, $R_2$ is $C_2H_5$, $R_3$ is $C_3H_6$, m is 3.5 on average, and n is 2.5 on average; and $R_4$ is H), Blemmer PP-1000 (a mixture of the above formula (1) wherein $R_1$ is $CH_3$, $R_3$ is $C_3H_6$, m is 0, and n is 4 to 6 on average; and $R_4$ is H), Blemmer PME-400 (a mixture wherein $R_1$ is $CH_3$, $R_2$ is $C_2H_5$, and m is 9 on average; n is 0 and $R_4$ is $CH_3$), etc.

In terms of polymerization stability, the amount of (meth)acrylic acid ester having an alkylene oxide group used is preferably 1 to 40 wt. %, more preferably 3 to 40 wt. %, even more preferably 5 to 30 wt. %, and particularly preferably 10 to 20 wt. %, based on the total amount of the polymerizable vinyl monomer.

Method for Producing Non-Spherical Resin Particles

The method for producing non-spherical resin particles is the so-called seed polymerization method, in which seed particles are allowed to absorb a polymerizable vinyl monomer in an aqueous emulsion, and the absorbed polymerizable vinyl monomer is polymerized. A general seed polymerization method is described below. Alternatively, non-spherical resin particles can also be produced by forming resin particles obtained by grinding a raw material resin into a spherical shape, and then applying physical force to the spherical particles; however, the production method is not limited to these methods.

First, seed particles are added to an aqueous emulsion comprising a polymerizable vinyl monomer and an aqueous medium.

Examples of the aqueous medium include water and mixed media of water and hydrophilic solvents (e.g., lower alcohol).

The aqueous medium contains a surfactant. The surfactant may be any of an anionic surfactant, a cationic surfactant, a nonionic surfactant, and an amphoteric surfactant.

Examples of anionic surfactants include fatty acid oils, such as sodium oleate and castor oil potassium; alkylsulfuric acid ester salts, such as sodium lauryl sulfate and lauryl ammonium sulfate; alkylbenzenesulfonic acid salts, such as sodium dodecylbenzenesulfonate; dialkylsulfosuccinic acid salts, such as alkylnaphthalenesulfonate, alkanesulfonate, and sodium dioctyl sulfosuccinate; alkenyl succinic acid salts (dipotassium salts), alkyl phosphate, naphthalenesulfonic acid formalin condensates; polyoxyethylene alkyl ether sulfuric acid salts, such as polyoxyethylene alkyl phenyl ether sulfuric acid ester salts and polyoxyethylene lauryl ether sodium sulfate; polyoxyethylene alkyl sulfuric acid ester salts; and the like.

Examples of cationic surfactants include alkylamine salts, such as laurylamine acetate and stearylamine acetate; quaternary ammonium salts, such as lauryl trimethyl ammonium chloride; and the like.

Examples of nonionic surfactants include polyoxyethylene alkyl ether, polyoxyethylene alkyl aryl ether, polyoxyethylene sorbitan fatty acid ester, polyoxyethylene fatty acid ester, and the like.

Examples of amphoteric surfactants include lauryldimethylamine oxide, phosphate ester-based surfactants, phosphite ester-based surfactants, and the like.

The above surfactants may be used singly or in combination of two or more. Of these surfactants, anionic surfactants are preferable in terms of the dispersion stability during polymerization.

The aqueous emulsion can be produced by a known method. For example, the aqueous emulsion can be obtained by adding a polymerizable vinyl monomer to an aqueous medium, and dispersing the mixture by a finely emulsifying device, such as a homogenizer, an ultrasonic processing machine, or a nanomizer. The polymerizable vinyl monomer may contain a polymerization initiator, if necessary. A polymerization initiator may be mixed beforehand with the polymerizable vinyl monomer and then dispersed in an aqueous medium, or both may be dispersed in separate aqueous media and then mixed. The particle diameter of the droplets of the polymerizable vinyl monomer in the obtained aqueous emulsion is preferably smaller than that of the resin particles because the polymerizable vinyl monomer is more efficiently absorbed by the resin particles.

The seed particles may be directly added to the aqueous emulsion, or may be added in a state in which the seed particles are dispersed in an aqueous dispersion medium (hereinafter referred to as "seed particle dispersion").

After the seed particles are added to the aqueous emulsion, the seed particles are allowed to absorb the polymerizable vinyl monomer. The absorption can generally be conducted by stirring the aqueous emulsion to which the seed particles are added at room temperature (about 20° C.) for 1 to 12 hours. The absorption may be promoted by warming the aqueous emulsion at about 30 to 50° C.

The seed particles are swollen by absorption of the polymerizable vinyl monomer. The mixing ratio of the polymerizable vinyl monomer to the seed particles is preferably such that the ratio of the polymerizable vinyl monomer is 5 to 150 parts by weight, and more preferably 10 to 120 parts by weight, based on 1 part by weight of the seed particles. If the mixing ratio of the monomer is smaller, the increase in the particle diameter by polymerization becomes small, thereby reducing productivity. If the mixing ratio of the monomer is larger, the monomer is not completely absorbed by the seed particles, and uniquely undergoes suspension polymerization in the aqueous medium, so that abnormal particles may be formed. The completion of absorption can be determined by confirming the increase in the particle diameter by observation with an optical microscope.

A polymerization initiator can be added, if necessary. Examples of polymerization initiators include organic peroxides, such as benzoyl peroxide, lauroyl peroxide, orthochlorobenzoyl peroxide, orthomethoxybenzoyl peroxide, 3,5,5-trimethylhexanoyl peroxide, t-butylperoxy-2-ethylhexanoate, and di-t-butyl peroxide; azo-based compounds, such as 2,2'-azobisisobutyronitrile, 1,1'-azobiscyclohexanecarbonitrile, and 2,2'-azobis(2,4-dimethylvaleronitrile); and the like. The polymerization initiator is preferably used in an amount of 0.1 to 3 parts by weight based on 100 parts by weight of the polymerizable vinyl monomer.

Next, the polymerizable vinyl monomer absorbed by the resin particles is polymerized to thereby obtain non-spherical resin particles.

The polymerization temperature can be suitably selected depending on the types of polymerizable vinyl monomer and polymerization initiator. The polymerization temperature is preferably 25 to 110° C., and more preferably 50 to 100° C. The polymerization reaction is preferably performed by increasing the temperature after the monomer, and optionally a polymerization initiator, are completely absorbed by the resin particles. After the completion of polymerization, if necessary, the non-spherical resin particles are subjected to centrifugal separation to remove the aqueous medium, and washed with water and a solvent, followed by drying and isolation.

In the above polymerization process, a polymer dispersion stabilizer may be added, in order to improve the dispersion stability of the non-spherical resin particles.

Examples of polymer dispersion stabilizers include polyvinyl alcohol, polycarboxylic acid, cellulose compounds (e.g., hydroxyethyl cellulose and carboxymethyl cellulose), polyvinyl pyrrolidone, and the like. Further, an inorganic water-soluble polymer compound, such as sodium tripolyphosphate, can be used in combination. Among these, polyvinyl alcohol and polyvinyl pyrrolidone are preferable. The amount of polymeric dispersion stabilizer added is preferably 1 to 10 parts by weight based on 100 parts by weight of the polymerizable vinyl monomer.

In addition, a water-soluble polymerization inhibitor may be used, in order to suppress the formation of emulsified particles in the water system. Examples of water-soluble polymerization inhibitors include nitrite compounds, sulfite compounds, hydroquinone compounds, ascorbic acid compounds, water-soluble vitamin B compounds, citric compounds, polyphenol compounds, etc.

Organic Solvent

The organic solvent used in step 1 is not particularly limited, as long as it is able to disperse the non-spherical resin particles, has a lower specific gravity than water, and is immiscible with water. Examples include toluene, benzene, xylene, normal hexane, cyclohexane, normal pentane, cyclopentane, methyl isobutyl ketone, cyclohexanone, propylene glycol monobutyl ether, and the like. Among these, toluene is preferable because the non-spherical resin particles can be easily dispersed therein.

Water

The water mentioned above refers to the water used in step 2. For example, ion exchange water can be used.

In the present specification, the phrase "able to disperse" means that when the non-spherical resin particles and an organic solvent are mixed, the dispersed particles are dispersed as single molecules, and are not dissolved with each other.

In the present specification, the term "immiscible" means that when water and an organic solvent are mixed, they are not dissolved with each other at the molecular level.

In the present specification, the phrase "lower specific gravity" means that the specific gravity of an organic solvent is lower than the specific gravity of water.

Step 2

Step 2 is to emulsify the mixture prepared in step 1 in water to obtain an emulsion.

The mixture of the non-spherical resin particles and an organic solvent obtained in step 1 can be emulsified and dispersed in water to thereby obtain an emulsion in which the mixture is emulsified in water.

Examples of the emulsification dispersion method include an emulsification method using ultrasonic irradiation, and an emulsification method using a finely emulsifying device, such as a homogenizer or a nanomizer.

Step 3

Step 3 is to allow the emulsion obtained in step 2 to stand to evaporate the organic solvent, and form a particle-aligned film of the non-spherical resin particles at the gas-liquid interface.

When the emulsion obtained in step 2 is allowed to stand for 5 to 12 hours, the organic solvent in which the non-spherical resin particles are dispersed is separated from water because the specific gravity of the organic solvent is lower than that of water. As a result, a two-phase separation state in which the organic solvent phase is present above the water phase is formed. Thereafter, the organic solvent of the organic solvent phase is evaporated to thereby form an aligned film of the non-spherical resin particles at the gas-liquid interface.

Figure 2:
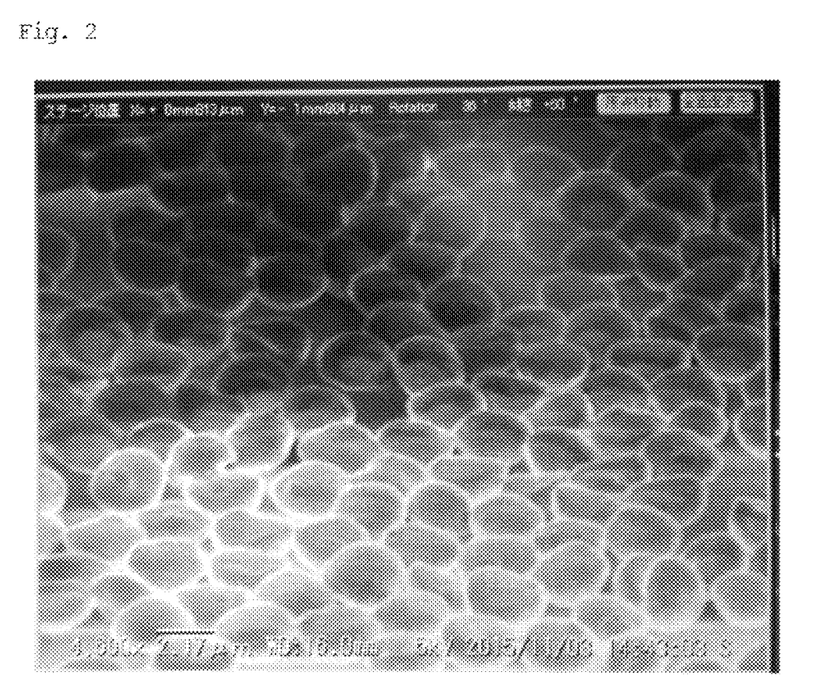
FIG. 2 shows a SEM photograph obtained by photographing a particle-aligned film of non-spherical resin particles obtained in an Example (Production Example 1 of Metal-Coated Non-spherical Resin Particles) by SEM.

For example, when the non-spherical resin particles have a hemispherical shape with a hemispherical portion and a flat portion, the non-spherical resin particles are aligned so that the hemispherical portion of each non-spherical resin particle is in contact with the water-phase surface, and the flat portion of each non-spherical resin particle faces the vapor-phase surface, so as to reduce the surface area in contact with the vapor phase. Due to such a structure, the semispherical non-spherical resin particles are regularly aligned on a plane; that is, they are two-dimensionally aligned in the same direction. For example, FIG. 2 shows a SEM photograph of an aligned film of non-spherical resin particles. This indicates that the non-spherical resin particles are two-dimensionally aligned in the same direction.

Moreover, when the non-spherical resin particles have a biconvex lens shape with a curved portion, the non-spherical resin particles are aligned so that each convex lens surface of the biconvex lens shape faces the water-phase surface or the vapor-phase surface so as to reduce the surface area in contact with the vapor phase. Due to such a structure, biconvex lens-like non-spherical resin particles are regularly aligned two-dimensionally on a plane. The same applies to flat non-spherical resin particles.

2. Method for Producing Aligned Film of Metal-Coated Non-Spherical Resin Particles The method for producing an aligned film of metal-coated non-spherical resin particles of the present invention comprises:

(4) step 4 of extracting a particle-aligned film of non-spherical resin particles obtained by the method for producing a particle-aligned film of non-spherical resin particles; and (5) step 5 of coating part of the extracted non-spherical resin particle-aligned film with metal.

Each step is described below.

Step 4

Step 4 is to extract the non-spherical resin particle-aligned film obtained in step 3.

A substrate is placed in the liquid having the particle-aligned film at the gas-liquid interface obtained in step 3, and the non-spherical resin particle-aligned film present at the gas-liquid interface is transferred to the substrate. Thus, the particle-aligned film can be extracted.

Usable substrates include transparent film substrates, such as films made of various resins; light transmission substrates made of various resins, other than transparent film substrates, such as transparent resin plates and glass plates; aluminum plates; etc.

Examples of the above resins include acrylic resins, (meth)acrylic acid alkyl-styrene copolymers, polycarbonate, polyethylene terephthalate (PET), and like polyesters, polyethylene, polypropylene, polystyrene, and the like.

Examples of the means for transferring the particle-aligned film to a substrate include a means for transferring the non-spherical resin particle-aligned film to a substrate by subjecting the substrate to hydrophilization treatment, such as surface oxidation treatment, using sodium hypochlorite etc., and vertically inserting the substrate into the liquid surface and then pulling it upward; and a means using an LB film-forming device etc.

Step 5

Step 5 is to coat part of the non-spherical resin particle-aligned film extracted in step 4 with metal.

Examples of the metal used to coat part of the non-spherical resin particle-aligned film include gold, silver, platinum, copper, aluminum, titanium, nickel, chromium, strontium, tin, and the like. Among these, gold and silver are preferable, in terms of light diffusion characteristics and reflection characteristics when used for optical applications. When plasmon resonances in visible light are used, gold, silver, platinum, and copper are preferable.

Examples of the metal-coating method include vapor deposition, ion plating, sputtering, laser abrasion, molecular beam epitaxy, CVD, and the like.

When the non-spherical resin particle-aligned film is coated with metal, the thickness of the metal coating is 1 nm to 500 nm.

In the present specification, the phrase stating that part of the non-spherical resin particle-aligned film is coated with metal means that the non-spherical resin particle-aligned film is locally coated with metal. Specifically, this phrase means that the non-spherical resin particle-aligned film has a portion coated with metal and a portion that is not coated with metal. For example, one side of the particle-aligned film is coated with metal.

Applications of the non-spherical resin particle-aligned film partially coated with metal are not limited. For example, this film is useful as a meta-molecule of a meta-material, a non-linear optical material, etc.

The metal-coated non-spherical resin particles of the present invention form an aligned film in which the particles are regularly aligned on a plane. For example, when an aligned film is formed so that plural metal-coated non-spherical resin particles are regularly aligned on a plane on a substrate (e.g., glass or a PET film), the film exhibits excellent light diffusion characteristics when used for optical applications.

3. Method for Producing Metal-Coated Non-Spherical Resin Particles

The method for producing metal-coated non-spherical resin particles of the present invention comprises extracting metal-coated non-spherical resin particles from the metal-coated non-spherical resin particle-aligned film obtained in step 5 to thereby obtain the metal-coated non-spherical resin particles.

Examples of the method for extracting metal-coated non-spherical resin particles from the metal-coated non-spherical resin particle-aligned film include a method in which the aligned film is crushed for each particle, and a method in which the aligned film is dispersed in water and irradiated with ultrasonic waves for separation.

The metal-coated non-spherical resin particles obtained by the above method for producing metal-coated non-spherical resin particles are described below.

4. Metal-Coated Non-Spherical Resin Particles

The metal-coated non-spherical resin particles of the present invention are preferably obtained by the above method for producing metal-coated non-spherical resin particles, and part of the surface of each non-spherical resin particle is coated with metal.

In the present specification, the phrase stating that part of the surface of the non-spherical resin particles is coated with metal means that the surface of the non-spherical resin particles is locally coated with metal. Specifically, this phrase means that the non-spherical resin particles have a surface coated with metal and a surface that is not coated with metal.

The phrase "part of the surface of the non-spherical resin particles is coated with metal" means that 1% or more and less than 100%, preferably 20% or more and less than 80%, and more preferably 25% or more and less than 75%, of the surface of the non-spherical resin particles is coated with metal.

When part of the surface of the metal-coated non-spherical resin particles of the present invention is coated with metal, metal-coated non-spherical resin particles having a spherical shape due to the thickness of the coating metal are excluded.

Next, the shape of the metal-coated non-spherical resin particles is described.

The metal-coated non-spherical resin particles of the present invention preferably have a circular outer shape when viewed from a direction in which the project area is the largest, and a non-circular outer shape when viewed from a direction in which the project area is the smallest.

Since non-spherical resin particles having the above structure have a circular outer shape when viewed from a direction in which the project area is the largest, and a non-circular outer shape when viewed from a direction in which the project area is the smallest, they can have shape anisotropy. Therefore, the effects (e.g., light diffusion effect and reflection effect) of the surface of the non-spherical resin-particles can have anisotropy.

The metal-coated non-spherical resin particles of the present invention preferably have an aspect ratio of 1.2 or more.

In the present specification, the aspect ratio of the metal-coated non-spherical resin particles means the ratio of the major axis of each metal-coated non-spherical resin particle to the minor axis thereof (major axis of metal-coated non-spherical resin particle/minor axis of metal-coated non-spherical resin particle).

The aspect ratio of each metal-coated non-spherical resin particle, when used for optical applications, is preferably 1.2 or more and 5.0 or less, more preferably 1.2 or more and 3.0 or less, even more preferably 1.2 or more and 2.5 or less, and particularly preferably 1.4 to 2.1, in terms of light diffusion characteristics, reflection characteristics, etc. This makes the shape anisotropy higher than that of spherical particles, that is, particles having an aspect ratio of 1. Thus, light diffusion and reflection become complicated, and consequently, optical materials having high light diffusion characteristics and reflection characteristics can be obtained.

The metal-coated non-spherical resin particles of the present invention preferably have a particle shape comprising (1) multiple flat portions, (2) a flat portion and a curved portion, or (3) a curved portion.

Metal-coated non-spherical resin particles having (1) multiple flat portions refer to, for example, particles having a triangular pyramid shape, a cubic shape, or a rectangular parallelepiped shape. The present specification also includes non-spherical resin particles consisting of multiple flat portions.

Metal-coated non-spherical resin particles having (2) a flat portion and a curved portion refer to, for example, particles having a hemispherical shape, a disc shape, or a cylindrical shape. The present specification also includes non-spherical resin particles consisting of a flat portion and a curved portion.

Metal-coated non-spherical resin particles having (3) a curved portion refer to, for example, particles having a Go-stone shape, an erythrocyte shape, a biconvex lens shape, or a concavo-convex lens shape. The present specification also includes non-spherical resin particles consisting of a curved portion.

According to the above structures (1) to (3), the shape of the metal-coated non-spherical resin particles is a regular shape composed of multiple surfaces; thus, they have high anisotropy.

The metal-coated non-spherical resin particles of the present invention preferably have a hemispherical shape with a hemispherical portion (curved portion) and a flat portion. Moreover, the metal-coated non-spherical resin particles of the present invention preferably have a biconvex lens shape with a curved portion, or a flat shape.

In the metal-coated non-spherical resin particles of the present invention, at least part of the surface of the hemispherical portion is preferably coated with metal. The phrase "at least part of the surface of the hemispherical portion is coated with metal" means that 1% or more and 100% or less, preferably 30% or more and 100% or less, and more preferably 50% or more and 100% or less, of the surface of the hemispherical portion is coated with metal.

In the metal-coated non-spherical resin particles of the present invention, at least part of the surface of the flat portion is preferably coated with metal. The phrase "at least part of the surface of the flat portion is coated with metal" means that 1% or more and 100% or less, preferably 30% or more and 100% or less, and more preferably 50% or more and 100% or less, of the surface of the flat portion is coated with metal.

In the metal-coated non-spherical resin particles of the present invention, at least part of the surface of the curved portion is preferably coated with metal. The phrase "at least part of the surface of the curved portion is coated with metal" means that 1% or more and 100% or less, preferably 30% or more and 100% or less, and more preferably 50% or more and 100% or less, of the surface of the curved portion is coated with metal.

Furthermore, since the metal-coated non-spherical resin particles of the present invention have a surface coated with metal and a surface that is not coated with metal, the particles themselves have special characteristics, such as anisotropic conductivity, anisotropic optical characteristics, anisotropic surface characteristics, anisotropic color-enhancing characteristics, and anisotropic heat characteristics.

Non-spherical resin particles having (1) multiple flat portions refer to, for example, metal-coated non-spherical resin particles having a triangular pyramid shape, a cubic shape, or a rectangular parallelepiped shape, in which only one surface of the flat portions of the shape is coated with metal.

Non-spherical resin particles having (2) a flat portion and a curved portion refer to, for example, metal-coated non-spherical resin particles having a hemispherical shape, a disc shape, or a cylindrical shape, in which only one surface of the flat portion of the shape is coated with metal.

Non-spherical resin particles having (3) a curved portion refer to, for example, metal-coated non-spherical resin particles having a biconvex lens shape, a flat shape, a Go-stone shape, an erythrocyte shape, or a bowl shape, in which a surface corresponding to one particle surface obtained by horizontally dividing each particle in half with respect to the particle thickness is coated with metal.

For example, in semispherical non-spherical resin particles having a hemispherical portion and a flat portion, when at least part of the surface of the hemispherical portion or flat portion is coated with metal, or in biconvex lens-like non-spherical resin particles having a curved portion, when at least part of one side of the convex lens shape is coated with metal, the characteristics, such as light diffusion characteristics and reflection characteristics, can be further improved, as shown in Examples provided later. Moreover, when flat non-spherical resin particles are each horizontally divided in half with respect to the particle thickness, and the one particle surface is coated with metal, the characteristics, such as light diffusion characteristics and reflection characteristics, can be further improved, as shown in Examples provided later.

The metal-coated non-spherical resin particles of the present invention preferably have phototaxis. In the present specification, the phrase "have phototaxis" means that the metal-coated non-spherical resin particles move when dispersed in water and irradiated with laser light (e.g., laser light at 405 nm and 75 mV).

Application of Metal-Coated Non-Spherical Resin Particles

Applications of the metal-coated non-spherical resin particles of the present invention are not limited. For example, the metal-coated non-spherical resin particles of the present invention can be used as additives for coating agents (coating compositions) used as coating agents for light diffusion members for light diffusion films (optical sheets) etc.; light diffusion agents that constitute light diffusion resin compositions for producing light diffusion plates; non-linear optical materials for second harmonic generation, and meta-materials that can control dielectric constant and permeability.

Furthermore, the metal-coated non-spherical resin particles of the present invention can be suitably used for the following applications.

The metal-coated non-spherical resin particles of the present invention preferably have a sphere-equivalent volume average particle diameter of 0.1 to 300 µm, more preferably 0.5 to 100 µm, and particularly preferably 1 to 30 µm. This makes the particles suitable for various applications.

When used as an additive material for coating agents, the metal-coated non-spherical resin particles of the present invention more preferably have a sphere-equivalent volume average particle diameter of 1 to 30 µm. This makes it possible to realize an optical sheet having excellent optical properties.

Moreover, when used as a component (light diffusion agent) of a light diffusion plate, the metal-coated non-spherical resin particles of the present invention preferably have a sphere-equivalent volume average particle diameter of 0.5 to 20 µm. This makes it possible to realize an optical diffusion member having excellent light diffusion characteristics.

Dispersion

The dispersion of the present invention comprises the metal-coated non-spherical resin particles of the present invention. The dispersion medium of the dispersion of the present invention is preferably an aqueous medium. In the present invention, the aqueous medium is a liquid comprising water as a main component, and may contain an organic solvent, such as alcohol, ketone, ester, or aromatic hydrocarbon.

Conductive Ink

The dispersion of the present invention preferably has electrical conductivity. Examples of dispersions having electrical conductivity include conductive coating compositions and conductive ink. For example, conductive ink comprises the dispersion of the present invention, and may contain a curable monomer and a binder resin, if necessary. Such conductive ink can be applied to substrates by, for example, an ink-jet method or a screen printing method, and then dried, followed by heating, thereby obtaining conductive members, such as wiring and thin films.

Resin Composition

The resin composition of the present invention comprises a base resin and the metal-coated non-spherical resin particles of the present invention. Since the resin composition of the present invention, which comprises the metal-coated non-spherical resin particles of the present invention, has excellent optical properties and electrical conductivity, it can be used as a raw material for illumination covers (illumination covers for light-emitting diode (LED) lighting, and illumination covers for fluorescent lamp lighting), and can also be used as a raw material for light diffusers, such as light diffusion sheets and light diffusion plates, or conductive resins. The base resin mentioned above can generally be a thermoplastic resin different from the component of the polymer that constitutes the metal-coated non-spherical resin particles.

Examples of thermoplastic resins include acrylic resins, (meth)acrylic acid alkyl-styrene copolymers, polycarbonate, polyester, polyethylene, polypropylene, polystyrene, and the like. Of these thermoplastic resins, acrylic resins, (meth) acrylic acid alkyl-styrene copolymers, polycarbonate, polyester, and polystyrene are preferable, when excellent transparency is required for the base resin. These thermoplastic resins can be used singly or in combination of two or more. The amount of the metal-coated non-spherical resin particles added to the above base resin is preferably 1 to 1000 parts by weight, and more preferably 10 to 500 parts by weight, based on 100 parts by weight of the base resin.

External Preparation

The external preparation of the present invention comprises the metal-coated resin particles of the present invention. The external preparation of the present invention exhibits optical properties when applied to the skin, and thus makes pores, spots, wrinkles, etc., inconspicuous. The content of the metal-coated non-spherical resin particles in the external preparation of the present invention can be suitably determined depending on the type of external preparation, but is preferably 1 to 90 wt. %, and more preferably 3 to 80 wt. %. The external preparation of the present invention can be used as, for example, an external pharmaceutical or a cosmetic. External pharmaceuticals are not particularly limited, as long as they are applied to the skin. Specific examples include creams, ointments, emulsions, etc. Examples of cosmetics include cleaning cosmetics, such as soap, body shampoo, facial cleansing cream, facial scrub, and toothpaste; make-up cosmetics, such as powders, face powders (loose powder, pressed powder, etc.), foundations (powder foundation, liquid foundation, emulsion foundation, etc.), lip stick, lip cream, rouge, eyebrow cosmetics (eye shadow, eyeliner, mascara, etc.), and nail polish; lotions, such as pre-shave lotion and body lotion; body external preparations, such as body powder and baby powder; skin care agents, such as face lotion, cream, and milky lotion (cosmetic milky lotion); antiperspirants (liquid antiperspirants, solid antiperspirants, cream antiperspirants, etc.), packs, shampoo cosmetics, hair dye, hairdressing, fragrance cosmetics, bath agents, sunscreen products, suntan products, shaving cream, and the like.

5. Particle Group of Metal-Coated Non-Spherical Resin Particles

The particle group of metal-coated non-spherical resin particles of the present invention preferably has an average aspect ratio of 1.2 or more, more preferably 1.2 to 5.0, and particularly preferably 1.4 to 3.5, in terms of light diffusion characteristics, reflection characteristics, etc., The average aspect ratio of the particle group of metal-coated non-spherical resin particles can be measured in the following manner.

Thirty metal-coated non-spherical resin particles randomly selected from the particle group of metal-coated non-spherical resin particles are observed by a scanning electron microscope "JSM-6360LV" (produced by JEOL Ltd.) at a magnification of 5,000× to 10,000×, and the major axis and minor axis of each metal-coated non-spherical resin particle are measured. The aspect ratio of the metal-coated non-spherical resin particles is calculated by the following equation, and the average value of the 30 particles is used.

Aspect ratio of metal-coated non-spherical resin particle=major axis of metal-coated non-spherical resin particle/minor axis of metal-coated non-spherical resin particle In the particle group of metal-coated non-spherical resin particles of the present invention, the coefficient of variation of the number average particle diameter is preferably 30% or less.

When the coefficient of variation of the number average particle diameter is 30% or less, the particle diameter of the particle group of metal-coated non-spherical resin particles becomes uniform, and the particle group is easily aligned. When the particle group is used for optical applications, functions such as light diffusion characteristics are easily exhibited.

Moreover, the coefficient of variation of the number average particle diameter is more preferably 10% or more and 20% or less, and particularly preferably 10% or more and 15% or less.

The coefficient of variation of the number average particle diameter of the metal-coated non-spherical resin particles can be measured by the Coulter counter method or the like.

In the particle group of metal-coated non-spherical resin particles of the present invention, the coefficient of variation of the aspect ratio is preferably 30% or less.

When the coefficient of variation of the aspect ratio is 30% or less, the particle diameter of the particle group of metal-coated non-spherical resin particles becomes uniform, and the particle group is easily aligned. When the particle group is used for optical applications, functions such as light diffusion characteristics are easily exhibited.

Moreover, the coefficient of variation of the aspect ratio is more preferably 10% or more and 20% or less, and particularly preferably 10% or more and 15% or less.

The coefficient of variation of the aspect ratio of the metal-coated non-spherical resin particles can be measured by measuring the length of an image photographed by a scanning electron microscope or the like.

EXAMPLES

The present invention is described in detail below based on Examples; however, the present invention is not limited to these Examples.

Weight Average Molecular Weight

The weight average molecular weight (Mw) was measured by gel permeation chromatography (GPC). The measured weight average molecular weight means polystyrene (PS)-equivalent weight average molecular weight. The measurement method is as follows. First, 50 mg of sample was dissolved in 10 ml of tetrahydrofuran (THF). The obtained solution was filtered through a 0.45-μm non-aqueous Chromatodisc. The obtained filtrate was analyzed by GPC, and PS-equivalent weight average molecular weight was measured. The measurement conditions of GPC were as shown below.

GPC apparatus: trade name "Gel Permeation Chromatograph HLC-8020," produced by Tosoh Corporation
Column: two columns, trade name "TSKgel GMH-XL-L," produced by Tosoh Corporation (diameter 7.8 mm×length 30 cm)
Column temperature: 40° C.
Carrier gas: tetrahydrofuran (THF)
Carrier gas flow rate: 1 mL/min
Injection/pump temperature: 35° C.
Detection: RI (differential refractive index detector)
Injection volume: 100 μL
Calibration curve standard polystyrene for calculating PS-equivalent weight average molecular weight: trade name "Shodex," produced by Showa Denko K.K. (weight average molecular weight: 1030000) and calibration curve standard polystyrene produced by Tosoh Corporation (weight average molecular weight: 5480000, 3840000, 355000, 102000, 37900, 9100, 2630, 870)

Average Particle Diameter of Seed Particles

The average particle diameter of seed particles was measured by a laser diffraction particle size analyzer (LS230, produced by Beckman Coulter). Specifically, 0.1 g of seed particles and 10 ml of 0.1 wt. % nonionic surfactant solution were placed in a test tube, and mixed by a touch mixer ("Touch Mixer MT-31," produced by Yamato Scientific Co., Ltd.) for 2 seconds. Thereafter, the seed particles in the test tube were dispersed for 10 minutes using a commercially available ultrasonic cleaner ("Ultrasonic Cleaner VS-150," produced by Velvo-Clear) to obtain a dispersion. While irradiating the dispersion with ultrasonic waves, the average particle diameter of the seed particles in the dispersion was measured by a laser diffraction particle size analyzer (LS230, produced by Beckman Coulter). The optical model during the measurement was fitted to the refractive index of the produced seed particles. When one type of monomer was used for the production of seed particles, the refractive index of a homopolymer of the monomer was used as the refractive index of the seed particles. When several types of monomers were used for the production of seed particles, an average value obtained by weighted-averaging the refractive index of a homopolymer of each monomer with the amount of each monomer was used as the refractive index of the seed particles.

Method for Measuring Length and Aspect Ratio of Non-Spherical Resin Particles

The length of the non-spherical resin particles was measured in the following manner. 30 randomly selected non-spherical resin particles were observed by a scanning electron microscope "JSM-6360LV" (produced by JEOL Ltd.) at a magnification of 5,000× to 10,000×, and the major axis and minor axis of each non-spherical resin particle were measured. The aspect ratio of the non-spherical resin particles was calculated by the following equation:

Aspect ratio of non-spherical resin particle=major axis of non-spherical resin particle/minor axis of non-spherical resin particle Coefficient of variation of aspect ratio=(standard deviation of aspect ratio of non-spherical resin particles)/(average aspect ratio of non-spherical resin particles)×100

Methods for Measuring Sphere-Equivalent Volume Average Particle Diameter and Sphere-Equivalent Number Average Particle Diameter of Non-Spherical Resin Particles and Metal-Coated Non-Spherical Resin Particles The sphere-equivalent volume average particle diameter and sphere-equivalent number average particle diameter of the non-spherical resin particles and metal-coated non-spherical resin particles were measured by Coulter Multisizer™ 3 (Beckman Coulter Analyzer). The measurement was carried out using an aperture calibrated according to the Multisizer™ 3 user's manual, published by Beckman Coulter.

The aperture used for measurement was suitably selected depending on the size of the polymer particles to be measured. Current (aperture electric current) and Gain (gain) were suitably determined depending on the size of the selected aperture. For example, when an aperture having a size of 50 μm was selected, Current (aperture electric current) was set to −800, and Gain (gain) was set to 4.

The measurement sample used herein was a dispersion obtained by dispersing 0.1 g of polymer particles in 10 mL of 0.1 wt. % nonionic surfactant aqueous solution using a touch mixer ("Touch Mixer MT-31," produced by Yamato Scientific Co., Ltd.) and a ultrasonic cleaner ("Ultrasonic Cleaner VS-150," produced by Velvo-Clear). During measurement, gentle stirring was performed to an extent in which bubbles were not formed in the beaker. The measurement was terminated when 100,000 polymer particles were measured.

The number average particle diameter of the non-spherical resin particles and metal-coated non-spherical resin particles was an arithmetic mean in the particle size distribution based on the number of 100,000 particles.

The number average particle diameter of the non-spherical resin particles and metal-coated non-spherical resin particles was an arithmetic mean in the particle size distribution based on the volume of 100,000 particles.

Method for Measuring Coefficient of Variation of Number Average Particle Diameter of Metal-Coated Non-Spherical Resin Particles The coefficient of variation (CV value) of the number average particle diameter of the non-spherical resin particles was calculated by the following equation:

Coefficient of variation of number average particle diameter of non-spherical resin particles=(standard deviation of particle size distribution based on the number of non-spherical resin particles)/(number average particle diameter of non-spherical resin particles)×100

Synthesis Example 1 of Emulsion for Forming Seed Particles

Water (600 g) as an aqueous medium, 100 g of methyl methacrylate as a (meth)acrylic acid ester, and 0.5 g of n-dodecyl mercaptan as a chain transfer agent were placed in a separable flask equipped with a stirrer, a thermometer, and a reflux condenser. While stirring the contents of the separable flask by a stirrer, the internal space of the separable flask was replaced with nitrogen, and the internal temperature of the separable flask was increased to 70° C. While maintaining the internal temperature of the separable flask at 70° C., 0.5 g of potassium persulfate as a polymerization initiator was added to the contents of the separable flask. Then, a polymerization reaction was performed over 8 hours while maintaining the internal temperature of the separable flask at 70° C., thereby obtaining an emulsion (aqueous emulsion). The obtained emulsion contained 14 wt. % of solid (methyl methacrylate polymer), and the solid was composed of spherical particles having an average particle diameter of 0.4 μm and a weight average molecular weight of 600,000.

Production Example 1 of Seed Particles

Water (550 g) as an aqueous medium, 70 g of the emulsion obtained in Synthesis Example 1, 100 g of 2,2,2-trifluoroethyl methacrylate as a (meth)acrylic acid ester having a $C_2$-$C_{10}$ halogenated alkyl group in its ester part, and 0.3 g of n-dodecyl mercaptan as a chain transfer agent were placed in a separable flask equipped with a stirrer, a thermometer, and a reflux condenser. While stirring the contents of the separable flask by a stirrer, the internal space of the separable flask was replaced with nitrogen, and the internal temperature of the separable flask was increased to 70° C. While maintaining the internal temperature of the separable flask at 70° C., 0.5 g of potassium persulfate as a polymerization initiator was added to the contents of the separable flask. Then, a polymerization reaction was performed over 8 hours while maintaining the internal temperature of the separable flask at 70° C. Thus, an emulsion containing seed particles (hereinafter referred to as "seed particle-containing emulsion") was obtained.

Production Example 1 of Non-Spherical Resin Particles

Methyl methacrylate (600 g), 300 g of ethylene glycol dimethacrylate, and 100 g of poly(ethylene glycol propylene glycol) monomethacrylate (product name: Blemmer 50PEP-300, produced by NOF Corporation; a mixture of the formula (1) wherein $R_1$=$CH_3$, $R_2$=$C_2H_4$, $R_3$=$C_3H_6$, $R_4$=H, m=3.5 on average, and n=2.5 on average) as polymerizable vinyl monomers, and 6 g of azobis butyronitrile as a polymerization initiator were placed in a 5-L reactor equipped with a stirrer and a thermometer, and mixed. The obtained mixture was mixed with 1 L of ion exchange water containing 10 g of sodium succinate sulfonate as a surfactant, and treated by a TK homomixer (produced by PRIMIX Corporation) at 8000 rpm for 10 minutes to obtain an aqueous emulsion. To the aqueous emulsion, 360 g of the resin particle-containing emulsion having an average particle diameter of 1.0 μm obtained in Production Example 1 of Seed Particles was added while stirring.

After stirring was continued for 3 hours, the dispersion was observed by an optical microscope. As a result, it was recognized that the polymerizable vinyl monomers in the aqueous emulsion were absorbed by the seed particles (swelling magnification: about 20×). Thereafter, 2000 g of aqueous solution in which 40 g of polyvinyl alcohol (PVA-224E, produced by Kuraray Co., Ltd.) was dissolved as a dispersion stabilizer was placed in the reactor, and polymerization was performed while stirring at 60° C. for 6 hours. When the obtained resin particles were observed by a scanning electron microscope, they were hemispherical non-spherical resin particles. Moreover, the sphere-equivalent volume average particle diameter of the non-spherical resin particles was 2.60 μm, and the coefficient of variation of the number average particle diameter was 11.8%.

Production Example 2 of Non-Spherical Resin Particles

Resin particles were obtained in the same manner as in Production Example 1 of Non-spherical Resin Particles, except that 600 g of styrene, 300 g of ethylene glycol dimethacrylate, and 100 g of poly(ethylene glycol propylene glycol) monomethacrylate (product name: Blemmer 50PEP-300, produced by NOF Corporation; a mixture of the formula (1) wherein $R_1$=$CH_3$, $R_2$=$C_2H_4$, $R_3$=$C_3H_6$, $R_4$=H, m=3.5 on average, and n=2.5 on average) were used as polymerizable vinyl monomers. When the obtained resin particles were observed by a scanning electron microscope, they were biconvex lens-like non-spherical resin particles. Moreover, the sphere-equivalent volume average particle diameter of the non-spherical resin particles was 2.57 μm, and the coefficient of variation of the number average particle diameter was 11.4%.

Production Example 3 of Non-Spherical Resin Particles

Pellets (50 g) of polyethylene terephthalate (trade name: GLOBIO BCB80, produced by Honam Petrochemical Corp.) and 100 g of 3-methoxy-3-methyl-1-butanol (trade name: Solfit, produced by Kuraray Co., Ltd.) were supplied in a 300-ml autoclave equipped with a stirrer, and stirred at 185° C. for 2 hours. Two hours later, the resultant was quickly cooled to room temperature, and the contents were filtered, washed with water, and dried in an oven at 80° C., thereby obtaining 49 g of pellets of polyester-based raw material resin that had been contacted with a solvent. The polyester-based raw material resin was coarsely pulverized by Rabomirusa (trade name: small pulverizer Rabomirusa PLUS LMPLUS, produced by Osaka Chemical Co., Ltd.), and then finely pulverized by Current Jet Mill CJ-10 (trade name, produced by Nisshin Engineering Inc.; grinding air pressure: 0.5 MPa). Thus, fine polyester resin particles having a volume average particles diameter of 6.5 m were obtained.

The above polyester resin particles were spheroidized with a surface fusing system (trade name: Meteorainbow MR-10, produced by Nippon Pneumatic Mfg. Co., Ltd.; hot-blast temperature: 450° C.). As a result, spherical polyester resin particles having a circularity of 0.98 were obtained.

The above spherical polyester resin particles (10 g), 10 ml of IPA, and 10 g of zirconia beads (diameter: 5 mm) were placed in a plastic jar container with an internal volume of 33 cc. The container was put in a stirrer (trade name: Awatori Rentaro, produced by Thinky Corporation), and stirring and mixing were performed at 2000 rpm for 10 minutes. The obtained slurry was filtered, washed with water, and dried, thereby obtaining flat polyester resin particles.

The sphere-equivalent volume average particle diameter of the non-spherical resin particles was 6.20 μm, and the coefficient of variation of the number average particle diameter was 29.1%.

Production Example 1 of Metal-Coated Non-Spherical Resin Particles

The hemispherical non-spherical resin particles having an average particle diameter of 2.60 μm (30 mg) obtained in Production Example 1 of Non-spherical Resin Particles and 3 ml of toluene were mixed, and the mixture was added to 100 ml of ion exchange water separately placed in a 100-ml beaker. The above mixed solution was emulsified by treatment with an ultrasonic disperser (trade name: US-1, produced by NSD) for 10 minutes.

The above emulsion was allowed to stand for 8 hours to evaporate the toluene, thereby obtaining a particle-aligned film on the beaker liquid surface. A glass plate hydrophilized with sodium hypochlorite was vertically inserted into the liquid surface and then pulled up, so that the particle-aligned film (non-spherical resin particle-aligned film) was transferred to the glass plate.

The obtained particle-aligned film was photographed by a scanning electron microscope (SEM) to obtain the SEM image shown in FIG. 2. The SEM image of FIG. 2 revealed that the non-spherical resin particles were regularly aligned on the glass plate so that their hemispherical portions faced the glass plate.

Further, silver was vapor-deposited on the particle-aligned film to thereby obtain an aligned film of metal-coated non-spherical resin particles. The metal-coated non-spherical resin particle-aligned film was dispersed in 50 ml of ion exchange water, and then irradiated with ultrasonic waves using an ultrasonic disperser (trade name: US-1, produced by NSD) to separate the aligned film, thereby obtaining metal-coated non-spherical resin particles in which the flat portion of each hemispherical shape was coated with metal.

The average aspect ratio of the obtained metal-coated non-spherical resin particles was 1.70, randomly measured particles all had an aspect ratio of 1.5 or more, the coefficient of variation of the aspect ratio was 11.7%, and the thickness of the metal coating was 60 nm. In the metal-coated non-spherical resin particles, the entire flat portion of each hemispherical shape was coated with metal; thus, it is computationally assumed that 30% of the surface of the non-spherical resin particles is coated with metal. Moreover, when the obtained metal-coated non-spherical resin particles were dispersed in water, and irradiated with laser light at 405 nm and 75 mV, it was confirmed that the metal-coated non-spherical resin particles moved (the particles had phototaxis).

Production Example 2 of Metal-Coated Non-Spherical Resin Particles

After a particle-aligned film (a particle-aligned film of non-spherical resin particles) was transferred to a glass plate in the same manner as in Production Example 1 of Metal-Coated Non-spherical Resin Particles, the adhesive surface of a cellophane tape was pressed to the particle-aligned film to transfer the film.

Figure 3:
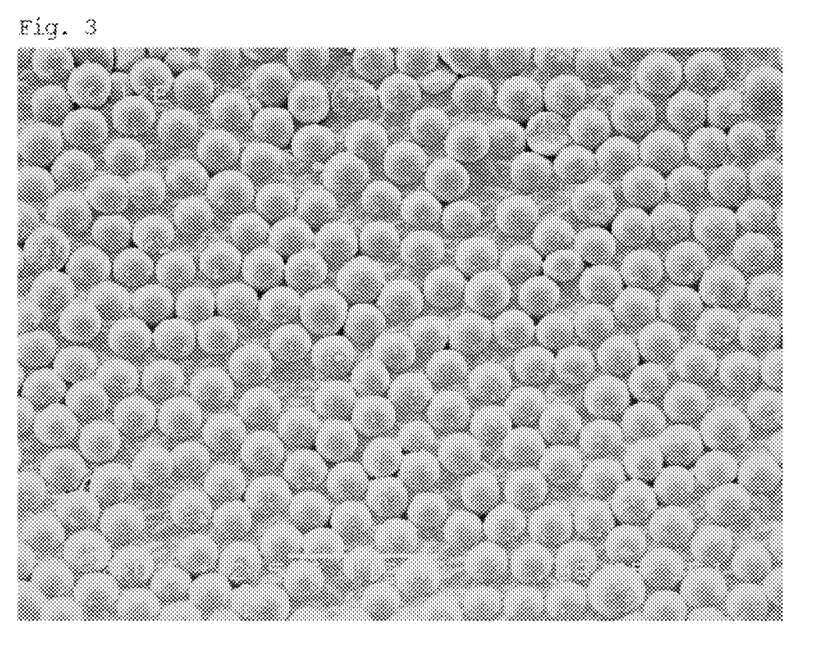
FIG. 3 shows a SEM photograph obtained by photographing a particle-aligned film of non-spherical resin particles obtained in an Example (Production Example 2 of Metal-Coated Non-spherical Resin Particles) by SEM.

The obtained particle-aligned film was photographed by a scanning electron microscope (SEM) to obtain the SEM image shown in FIG. 3. The SEM image of FIG. 3 revealed that the non-spherical resin particles were regularly aligned on the cellophane tape so that their flat portions faced the cellophane tape.

Further, platinum was vapor-deposited on the particle-aligned surface to thereby obtain an aligned film of metal-coated non-spherical resin particles. The metal-coated non-spherical resin particle-aligned film was immersed in 50 ml of acetone, and irradiated with ultrasonic waves using an ultrasonic disperser (trade name: US-1, produced by NSD) to separate the aligned film, thereby obtaining metal-coated non-spherical resin particles in which the hemispherical surface of each hemispherical shape was coated with metal. The thickness of the metal coating of the obtained metal-coated non-spherical resin particles was 65 nm. In the metal-coated non-spherical resin particles, the entire hemispherical portion of each hemispherical shape was coated with metal; thus, it is computationally assumed that 70% of the surface of the non-spherical resin particles is coated with metal.

Production Example 3 of Metal-Coated Non-Spherical Resin Particles

A particle-aligned film (an aligned film of non-spherical resin particles) was transferred to a glass plate in the same manner as in Production Example 1 of Metal-Coated Non-spherical Resin Particles, except that the biconvex lens-like non-spherical resin particles having an average particle diameter of 2.57 μm obtained in Production Example 2 of Non-spherical Resin Particles were used.

Figure 4:
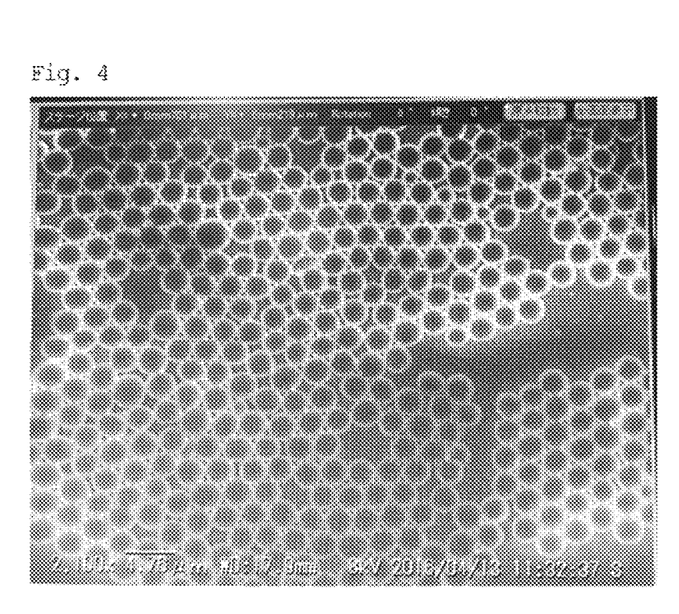
FIG. 4 shows a SEM photograph obtained by photographing a particle-aligned film of non-spherical resin particles obtained in an Example (Production Example 3 of Metal-Coated Non-spherical Resin Particles) by SEM.

The obtained particle-aligned film was photographed by a scanning electron microscope (SEM) to obtain the SEM image shown in FIG. 4. The SEM image of FIG. 4 revealed that the non-spherical resin particles were regularly aligned on the glass plate so that their convex lens portions faced the glass plate.

Further, platinum was vapor-deposited on the particle-aligned film to thereby obtain an aligned film of metal-coated non-spherical resin particles. The metal-coated non-spherical resin particle-aligned film was dispersed in 50 ml of ion exchange water, and then irradiated with ultrasonic waves using an ultrasonic disperser (trade name: US-1, produced by NSD) to separate the aligned film, thereby obtaining metal-coated non-spherical resin particles in which one side lens portion of each biconvex lens shape was coated with metal.

The average aspect ratio of the obtained metal-coated non-spherical resin particles was 1.50, randomly measured particles all had an aspect ratio of 1.4 or more, the coefficient of variation of the aspect ratio was 10.1%, and the thickness of the metal coating was 55 nm. In the metal-coated non-spherical resin particles, a half-surface of each biconvex shape was coated with metal; thus, it is computationally assumed that 50% of the surface of the non-spherical resin particles is coated with metal.

Production Example 4 of Metal-Coated
Non-Spherical Resin Particles

The flat polyester resin particles (30 mg) obtained in Production Example 3 of Non-spherical Resin Particles were dispersed in 3 ml of toluene. The resulting dispersion was gently developed on the water surface of 100 ml of ion exchange water separately placed in a 100-ml beaker. After development, the resultant was allowed to stand for 8 hours to evaporate the toluene, thereby obtaining a particle-aligned film on the beaker liquid surface. A glass plate hydrophilized with sodium hypochlorite was vertically inserted into the liquid surface and then pulled up, so that the particle-aligned film (non-spherical resin particle-aligned film) was transferred to the glass plate.

Further, platinum was vapor-deposited on the particle-aligned film to thereby obtain an aligned film of metal-coated non-spherical resin particles. The metal-coated non-spherical resin particle-aligned film was dispersed in 50 ml of ion exchange water, and then irradiated with ultrasonic waves using an ultrasonic disperser (trade name: US-1, produced by NSD) to separate the aligned film, thereby obtaining metal-coated non-spherical resin particles in which one particle surface obtained by horizontally dividing each flat polyester particle in half with respect to the particle thickness was coated with metal.

The average aspect ratio of the obtained metal-coated non-spherical resin particles was 1.55, randomly measured particles all had an aspect ratio of 1.3 or more, the coefficient of variation of the aspect ratio was 13.1%, and the thickness of the metal coating was 35 nm. In the metal-coated non-spherical resin particles, one surface obtained by horizontally dividing each particle in half with respect to the particle thickness was coated with metal; thus, it is computationally assumed that 50% of the surface of the non-spherical resin particles is coated with metal.

The invention claimed is:

1. Metal-coated non-spherical resin particles, in which 20% or more and less than 80% of the surface of non-spherical resin particles is coated with metal,
wherein the sphere-equivalent volume average particle diameter of the non-spherical resin particles is 0.1 to 300 μm
and wherein the non-spherical resin particles have an aspect ratio of 1.2 or more.

2. The metal-coated non-spherical resin particles according to claim 1, wherein the non-spherical resin particles have a circular outer shape when viewed from a direction in which a project area is the largest, and the non-spherical resin particles have a non-circular outer shape when viewed from a direction in which a project area is the smallest.

3. The metal-coated non-spherical resin particles according to claim 1, wherein the non-spherical resin particles have (1) multiple flat portions, (2) a flat portion and a curved portion, or (3) a curved portion.

4. The metal-coated non-spherical resin particles according to claim 1, wherein the non-spherical resin particles have a surface coated with metal and a surface that is not coated with metal.

5. The metal-coated non-spherical resin particles according to claim 1, wherein the non-spherical resin particles have a hemispherical shape with a hemispherical portion and a flat portion.

6. The metal-coated non-spherical resin particles according to claim 5, wherein at least part of the surface of the hemispherical portion is coated with metal.

7. The metal-coated non-spherical resin particles according to claim 5, wherein at least part of the surface of the flat portion is coated with metal.

8. The metal-coated non-spherical resin particles according to claim 1, wherein the non-spherical resin particles have a biconvex lens shape with a curved portion, or a flat shape.

9. The metal-coated non-spherical resin particles according to claim 8, wherein only one side convex lens portion of the biconvex lens shape is coated, or only one side portion of the flat shape is coated.

10. Metal-coated non-spherical resin particles, in which 1% or more and less than 100% of the surface of non-spherical resin particles is coated with metal,
wherein the sphere-equivalent volume average particle diameter of the non-spherical resin particles is 0.1 to 300 μm, and
wherein the metal-coated non-spherical resin particles have phototaxis.

11. The metal-coated non-spherical resin particles according to claim 10, wherein the non-spherical resin particles have an aspect ratio of 1.2 or more.

12. The metal-coated non-spherical resin particles according to claim 10, wherein the non-spherical resin particles have a circular outer shape when viewed from a direction in which a project area is the largest, and the non-spherical resin particles have a non-circular outer shape when viewed from a direction in which a project area is the smallest.

13. The metal-coated non-spherical resin particles according to claim 10, wherein the non-spherical resin particles have (1) multiple flat portions, (2) a flat portion and a curved portion, or (3) a curved portion.

14. The metal-coated non-spherical resin particles according to claim 10, wherein the non-spherical resin particles have a surface coated with metal and a surface that is not coated with metal.

15. The metal-coated non-spherical resin particles according to claim 10, wherein the non-spherical resin particles have a hemispherical shape with a hemispherical portion and a flat portion.

16. The metal-coated non-spherical resin particles according to claim 15, wherein at least part of the surface of the hemispherical portion is coated with metal.

17. The metal-coated non-spherical resin particles according to claim 15, wherein at least part of the surface of the flat portion is coated with metal.

18. The metal-coated non-spherical resin particles according to claim 10, wherein the non-spherical resin particles have a biconvex lens shape with a curved portion, or a flat shape.

19. The metal-coated non-spherical resin particles according to claim 18, wherein only one side convex lens portion of the biconvex lens shape is coated, or only one side portion of the flat shape is coated.

* * * * *